J. HALLINAN.
Skid.
No. 222,898.  Patented Dec. 23, 1879.
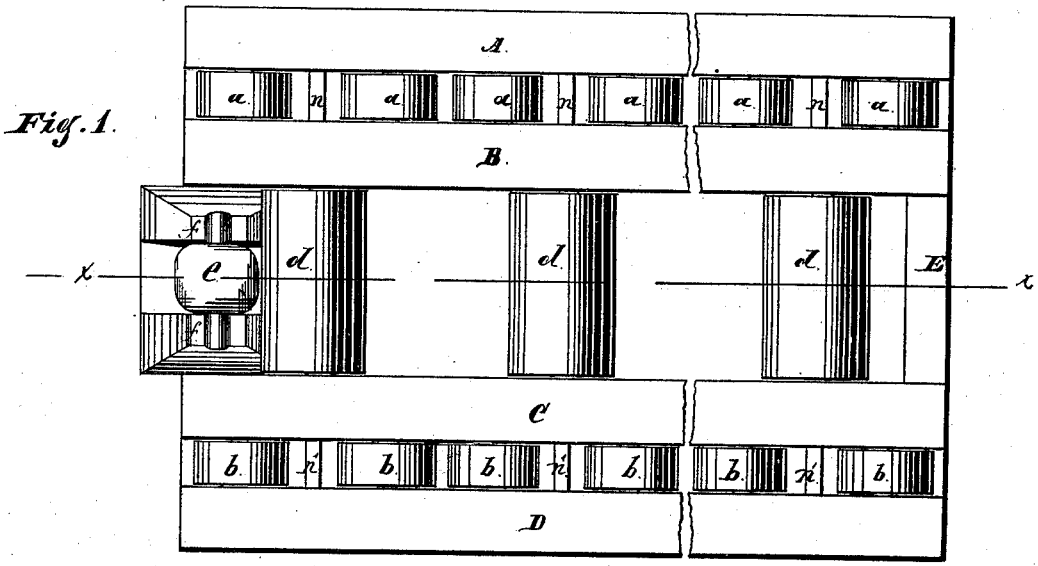
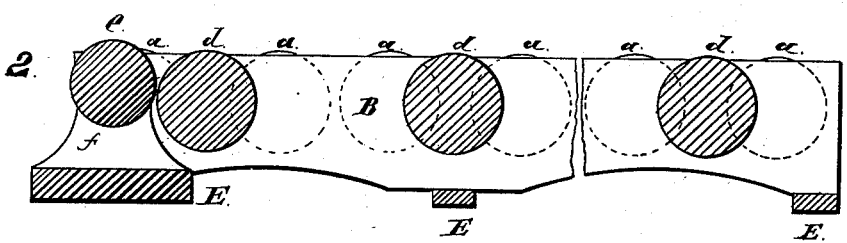
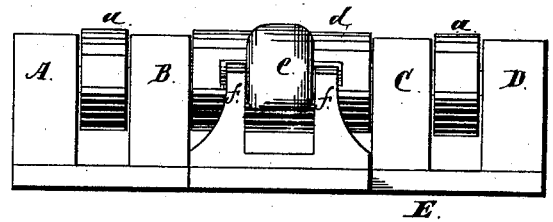
Witnesses:  Inventor:

UNITED STATES PATENT OFFICE.

JOHN HALLINAN, OF ENGLEWOOD, ILLINOIS.

IMPROVEMENT IN SKIDS.

Specification forming part of Letters Patent No. 222,898, dated December 23, 1879; application filed May 13, 1879.

*To all whom it may concern:*

Be it known that I, JOHN HALLINAN, of Englewood, Cook county, State of Illinois, have invented a new and useful Improvement in Skids, of which the following is a full description, reference being had to the accompanying drawings, in which—

Figure 1 is a plan. Fig. 2 is a vertical longitudinal section at line $x$ of Fig. 1. Fig. 3 is an end elevation.

It is customary to use skids upon and over which to move boxes and other flat-bottomed articles from one place to another over a level surface.

The object of my invention is to facilitate the work and overcome to a large degree the friction; and it consists in providing the skid with a number of friction-rollers, as hereinafter fully set forth.

In the drawings, A B represent two pieces of wood of any suitable size and length, between which are a number of rollers, $a$, which revolve on suitable axles or pins, the ends of which are located in the pieces A B. $n$ are short bars between the pieces A and B. C D are two other pieces similar to A B, and $b$ are rollers between these pieces A B, supported the same as the rollers $a$. $n'$ are short bars similar to $n$. E are cross-pieces secured to the under side of A B C D, as shown, by means of which the two sides of the skid are secured and held in position relatively to each other. Instead of these cross-bars E iron rods might be used passing through A B C D held by nuts.

$d$ are rollers between B and C, rotating on suitable iron rods, or provided with journals rotating in bearings in B and C. $e$ is a roller supported in suitable bearings $f$ upon the end bar E. It is located midway between B and C, and stands a little higher than the rollers $a$, $b$, and $d$, which rollers $a$ $b$ $d$ are a little higher than the top of the pieces A B C D.

For some purposes it may be desirable to make the skid stationary by securing it to the floor of a building, in which case the roller $e$ might be supported in bearings connected directly with the floor, if the bars E are omitted and rods used instead thereof.

In use, boxes and other flat-bottomed articles can be easily moved upon the skid over the rollers, and having reached the end of the skid can be pushed up onto the roller $e$, and on it can be turned partly around, which will often be convenient, as the shape of many boxes is such that it is desirable to turn them partly around before transferring them from the skid to a truck.

When it is not necessary to do this the roller $e$ can be removed from its bearings.

I do not claim, separately, any of the several parts of the skid; but

What I claim as new, and desire to secure by Letters Patent, is as follows:

1. A skid consisting of the pieces A B C D, suitably connected together by cross-bars or rods, and the rollers $a$ $b$, in combination with the roller $e$, substantially as and for the purposes specified.

2. The combination of the frame, constructed substantially as described, and the roller $e$ with the rollers $a$, $d$, and $d'$, substantially as specified.

3. In a skid having rollers for moving articles over them, the elevated rollers $e$, forming a pivot upon which the articles may be turned, substantially as described.

JOHN HALLINAN.

Witnesses:
 E. A. WEST,
 O. W. BOND.